Sept. 3, 1935.  N. E. DELL  2,013,236
AIR COMPRESSING APPARATUS
Filed Jan. 17, 1935  2 Sheets-Sheet 1
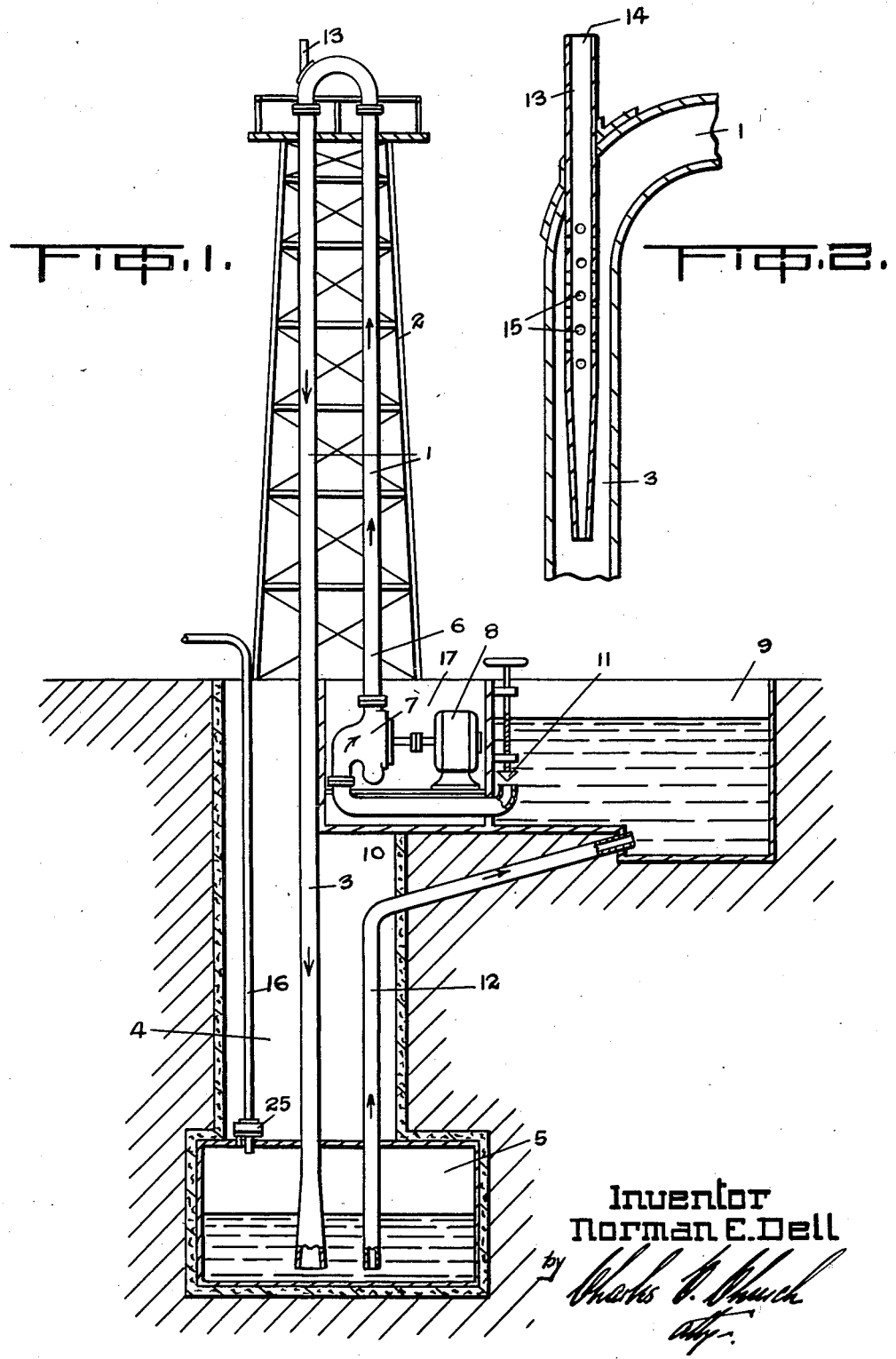
Inventor
Norman E. Dell Sept. 3, 1935.        N. E. DELL        2,013,236
AIR COMPRESSING APPARATUS
Filed Jan. 17, 1935        2 Sheets-Sheet 2
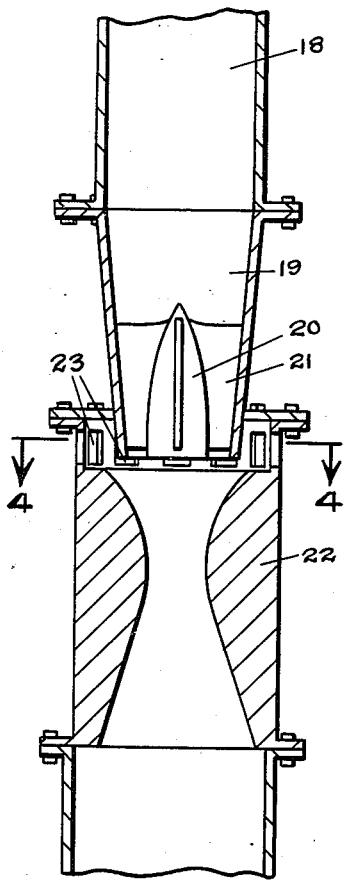
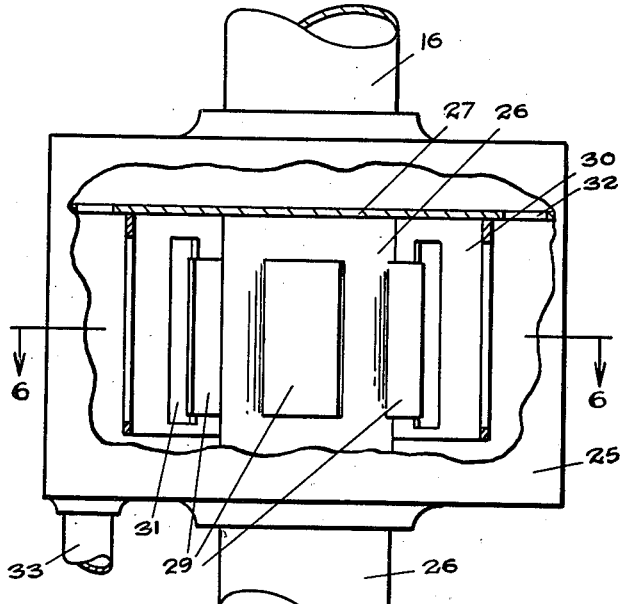
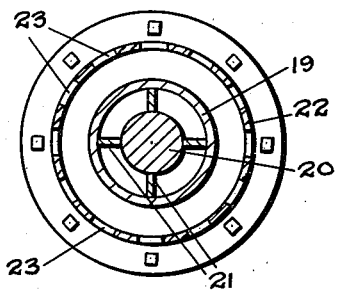
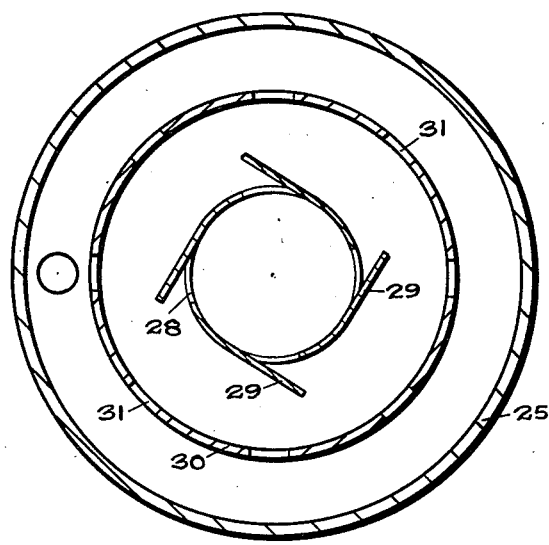
Inventor
Norman E. Dell Patented Sept. 3, 1935

2,013,236

UNITED STATES PATENT OFFICE 2,013,236

AIR COMPRESSING APPARATUS

Norman Eugene Dell, Buffalo, N. Y.

Application January 17, 1935, Serial No. 2,165

1 Claim. (Cl. 230—105)

My invention relates to improvements in apparatus for compressing air, and the object of my invention is to provide such an apparatus wherein a falling body of water is utilized to entrain air from the atmosphere and carry it downwardly into a receiving tank in which the air is allowed to separate from the water and build up in pressure.

Another and particular object of my invention is to design my apparatus for use in localities where a natural fall of water is not available.

A further object of my invention is to so construct my compressor that it can be exposed to the weather without danger of ice forming in any of the water pipes during periods of intermittent use in winter weather.

My invention consists of an air compressing apparatus constructed and arranged all as hereinafter more particularly described and illustrated in the accompanying drawings in which:—

Figure 1 is a side elevational view of my apparatus, partly in section, and with its lower portion embedded in the ground.

Figure 2 is an enlarged vertical cross sectional view through an air intake tube, used in my apparatus as shown in Figure 1.

Figure 3 is a vertical cross sectional view of an alternative form of air intake which can be used.

Figure 4 is a horizontal cross sectional view taken through the line 4—4, Figure 3.

Figure 5 is a side elevational view, partly broken away, of a water trap through which the compressed air is passed in leaving the compressed air tank, and Figure 4 is a horizontal cross sectional view taken through the line 6—6, Figure 5.

Like characters of reference indicate corresponding parts in the different views of the drawings.

In the preferred construction of my invention as illustrated in Figure 1, I furnish a water circulating system which has its lower portion embedded in the ground and its upper portion projecting upwardly from the ground level. The circulating system comprises an inverted U-shaped water pipe 1 forming the upper portion of the system and carried by a tower 2. One leg 3 of the pipe 1 extends downwardly into the ground in a shaft 4 and passes into a separating tank 5 positioned at the bottom of the shaft. The lower end of the pipe leg 3 is open and positioned in proximity to the bottom of the tank 5.

The lower end 6 of the other leg of the pipe 1 is connected to the outlet end of a water pump 7 positioned below the ground level and actuated by an electric motor 8. The pump 7 is fed from a water reservoir 9, through a feed pipe 10 extending from the reservoir to the inlet end of the pump. The passage of water from the reservoir to the pump is valve controlled, as by the hand actuated valve 11 which seats in the open end of the pipe 10. A pipe 12 forms the communication between the tank 5 and the reservoir 9, the lower end of such pipe 12 being in the vicinity of the bottom of the tank 5 so that it is immersed in the water in the tank.

Air is introduced into the water circulating system through an air intake tube 13 which projects into the U pipe 1 at the top of the long leg 3. The tube 13 is open at its upper end 14 which projects above the top of the bend in the pipe 1, and along its length protruding into the leg 3, is formed with a number of orifices 15. The lower end of the tube 13 is tapered and also open.

When my apparatus is put into operation the pump 7 is actuated by the motor 8 and water drawn from the reservoir 9, through the pipe 10 and pump, and into the leg 2 of the U pipe 1, as indicated by the arrows. The water is pumped over the top bend of the U pipe and descends through the pipe leg 3 into the tank 5. As the water passes around the bend in the U pipe and falls in the leg 3, air is inducted through the tube 13, and is entrained and carried down by the descending water into the tank 5. The air liberates itself from the water in the tank 5 and is at a pressure depending upon the vertical distance between water levels in the tank 5 and reservoir 9. The compressed air is drawn from the tank 5 through an air pipe extending from the tank to the ground level.

The reservoir 9 is preferably made large and deep enough to keep an ample operating water supply available at a low temperature. The main reasons for placing the reservoir 9 at or near the surface of the ground are that it is the cheapest and at the same time most convenient way of getting a large water capacity, large cooling surface and a nearly constant water level, while it permits ice to form only at the surface of the water where it cannot do any damage, or interfere with the normal operation of the compressor.

The pump and its motor are located in a separate pit or well 17 at a position below the water level in the reservoir 9, so that the pump is always primed when not in use. When the operation of my apparatus is stopped the water contained within the U pipe 1, will in seeking its own level, run out of the section of the U pipe above the level of the water in the reservoir 9, i. e. about the ground level, thereby obviating any damage which might occur through freezing of water in the exposed U pipe section. It will of course be understood that the air pressure in the tank 5 will prevent the water from the reservoir completely filling the tank, in fact the air pressure in the tank is in relation to the difference between the tank and reservoir water levels.

Figures 3 and 4 of the drawings show an alternative form of air inductor which I may use. In this construction, the pipe 18 is part of the upper end of the leg 3 near the rounded top of the U pipe. The lower end of the pipe 18 is connected to a pipe length 19 of inverted frustrum conical form, and which contains a central bullet-shaped member 20 having fins 21 radiating therefrom to the wall of the containing pipe. The lower end of the pipe length 19 projects into the upper end of a throat pipe 22 which is formed at its upper end with air induction orifices 23. As the downwardly flowing water passes through the conical pipe 19 it is held against any tendency to swirl by the fins 21, and a ready induction of air takes place in the water passage from the bottom of the member 20 to the central restriction in the throat pipe 22. The water continues its downward flow through the pipe 24, which corresponds to the remainder of the leg 3.

In Figures 5 and 6, I illustrate my water trap which I positioned at the connection between the tank 5 and air pipe 16, as illustrated in Figure 1. This device, through which the compressed air passes, is provided to prevent the passage of water with the air. It consists of an outer circular shell 25, into which an air pipe 26 from the tank 5 extends. The upper end of the air pipe 26 is closed by a partition 27 extending across the shell intermediately of its height. The portion of the air pipe 26 within the shell is formed with slots 28 each having a tangential shield 29 protruding from one edge. The pipe 26 and shields are surrounded by a skirt 30 depending from the partition 27 and containing slots 31. The peripheral portion of the partition 27 exteriorly of the skirt 30 is formed with orifices 32, thus permitting communication between the slotted pipe 26 and the pipe 16 communicating with the portion of the shell above the partition 27. As the air passes upwardly through the pipe 26 it has to pass through the tortuous paths formed by the slots and shields and any contained water is thrown off against the skirt and drains from the shell through the drain pipe 33 back into the tank 5.

From the foregoing description, it will be seen that I have devised a very simple air compressing mechanism, and although I have shown a particular embodiment thereof, it is to be understood that my invention is susceptible to alteration without departing from the spirit thereof as set forth in the appended claim.

What I claim as my invention is:

An air compressing mechanism of the character described, comprising a water reservoir positioned so that its water level is substantially at ground level, a water and air separating tank embedded in the ground, an inverted U pipe having one leg extending to the separating tank and the other leg communicating with the reservoir, an air pipe extending from the separating tank to the ground level, a water trap coupled between the separating tank and the lower end of the air pipe, a plurality of perforated baffle plates contained within the trap, a water return pipe extending from the separating tank to the water reservoir, an air intake element opening into the top portion of the leg of the U pipe communicating with the separating tank, and a water circulating pump coupled between the water reservoir and the U pipe and positioned below the water level in the reservoir.

NORMAN EUGENE DELL.